United States Patent [19]

Narikiyo

[11] Patent Number: 4,916,913
[45] Date of Patent: Apr. 17, 1990

[54] AIR CONDITIONING APPARATUS HAVING TWO REFRIGERATING CIRCUITS IN CENTRAL UNIT AND CONTROL METHOD OF DEFROSTING THE SAME

[75] Inventor: Hidetoshi Narikiyo, Fuji, Japan

[73] Assignee: Kabushiki Kaisha Toshiba, Kawasaki, Japan

[21] Appl. No.: 225,913

[22] Filed: Jul. 29, 1988

[30] Foreign Application Priority Data

Sep. 10, 1987 [JP] Japan .................. 62-227303

[51] Int. Cl.[4] ............................................. F25D 21/06
[52] U.S. Cl. ........................................ 62/81; 62/152; 62/175; 62/180; 62/278; 62/228.5; 236/49.3
[58] Field of Search ............... 62/81, 175, 151, 152, 62/186, 180, 160, 278, 277, 228.4, 228.5; 165/16; 236/49.3

[56] References Cited

U.S. PATENT DOCUMENTS

| 2,984,082 | 5/1961 | Coblentz | 62/180 |
| 3,103,793 | 9/1963 | Kyle et al. | 62/140 |
| 4,086,781 | 5/1978 | Brody et al. | 62/180 |
| 4,353,409 | 10/1982 | Saunders et al. | 62/186 X |
| 4,543,796 | 10/1985 | Han et al. | 62/160 |

FOREIGN PATENT DOCUMENTS

| 0027604 | 4/1981 | European Pat. Off. | 62/278 |
| 60-23736 | 2/1985 | Japan. | |
| 1554759 | 10/1979 | United Kingdom. | |
| 2017286 | 10/1979 | United Kingdom. | |

Primary Examiner—Harry B. Tanner
Attorney, Agent, or Firm—Cushman, Darby & Cushman

[57] ABSTRACT

An air conditioning apparatus includes two different refrigerating circuits in one central unit for supplying a conditioned air into a defined space through an air duct. Each refrigerating circuit has an air exhausting damper for exhausting internal air from the defined space, and an external air intake damper for taking the external air into the defined space through the central unit. One of the refrigerating circuits forcibly carries out the heating operation, and the external air intake damper thereof is maintained in a closed state while the other refrigerating circuit carries out the defrosting operation to prevent temperature of the conditioned air fed from the central unit into the defined space from decreasing below a desirable level.

15 Claims, 7 Drawing Sheets

AIR CONDITIONING APPARATUS HAVING TWO REFRIGERATING CIRCUITS IN CENTRAL UNIT AND CONTROL METHOD OF DEFROSTING THE SAME

BACKGROUND OF THE INVENTION

1. Field of the invention

This invention relates, in general, to air conditioning apparatus. In particular, the invention relates to a heat-pump type air conditioning apparatus including a central unit which supplies a conditioned air into a defined space through an air duct.

2. Description of the related art

A well known air conditioning apparatus of the above type typically includes a central unit which is partitioned into an internal air flow chamber and an external air flow chamber by a partition wall. An internal heat-exchanger and an internal fan device arranged parallel to the heat-exchanger are disposed in the internal air flow chamber to provide conditioned air into a defined space through the internal heat-exchanger. A compressor is arranged in a compartment defined in the internal air flow chamber to prevent heat and noises from the compressor from exhausting into the internal air flow chamber. An external heat-exchanger, an external fan device arranged parallel to the external heat-exchanger, etc. are disposed in the external air flow chamber. An exhausting damper and a ventilating damper are respectively arranged to the partition wall. Air in the internal air flow chamber is discharged to the external air flow chamber through the exhausting damper when the exhausting damper is opened. Air in the external air flow chamber is taken into the internal air flow chamber through the ventilating damper when the ventilating damper is opened. Therefore, air in the defined space is exhausted through the internal air flow chamber and the external air flow chamber when the exhausting and ventilating dampers are operated. A circulating air intake cell is disposed at the upper part of the internal air flow chamber, and an external air intake cell is disposed at the lower part of the external air flow chamber. A circulating damper is disposed between the circulating air intake cell and the internal air flow chamber for controlling the amount of air circulating into the internal air flow chamber. An external air intake damper is disposed between the external air intake cell and the external air flow chamber to control an amount of an external air into the external air flow chamber. The exhausting damper and the external air intake damper are closed in the cooling operation, the heating operation, and the defrosting operation.

In the above-described air conditioning apparatus, the amount of carbonic acid gas in the defined space is detected by a sensor during cooling or heating. The exhausting damper and the external air intake damper are opened when carbonic acid gas detected by the sensor is above a predetermined level. Therefore, a part of the circulating air flowing into the circulating air intake cell is discharged to the external air flow chamber through the exhausting damper. Simultaneously, a part of the external air flowing into the external air intake cell is taken into the internal air flow chamber through the external air intake damper. Thus, the ventilating operation is carried out, as described above.

In the above-described air conditioner, frost may be adhered on the external heat-exchanger of the central unit while the heating operation is carried out. In order to remove frost from the external heat-exchanger, the four-way valve is operated, and thus, a hot gas (refrigerant) fed from the compressor is supplied to the external heat-exchanger. Therefore, the external heat-exchanger acts as a condenser to evaporate the frost thereon. However, since the internal heat-exchanger acts as an evaporator during the defrosting operation, cold air is supplied into the defined space in spite of heating the defined space.

To avoid the above-described problem, two different refrigerating circuits are arranged in the central unit. If the defrosting operation is needed in one of two different refrigerating circuits during the heating operation, the one refrigerating circuit begins the defrosting operation, and the other refrigerating circuit continues the heating operation. Cold air fed from the one refrigerating circuit which carries out the defrosting operation, and hot air fed from the other refrigerating circuit are mixed to control the temperature of the conditioned air flowing into the defined space from the central unit. The temperature of the conditioned air is regulated at substantially the same level as that in the defined space. Therefore, flow of the cold air into the defined space may be avoided.

However, in the above-described system, the above-described ventilating operation may be carried out in the other refrigerating circuit which continues the heating operation while the defrosting operation is carried out in the one of the refrigerating circuits. When the ventilating operation begins in the other refrigerating circuit, external air having a relatively low temperature flows into the internal air flow chamber, and is mixed with the circulating air, resulting in decrease in the temperature of the conditioned air flowing into the defined space. The temperature in the defined space also decreases.

SUMMARY OF THE INVENTION

Accordingly, t is an object of the present invention to avoid flow of cold air from an air conditioning apparatus into a defined space even though the defrosting operation is carried out during heating.

It is another object of the present invention to provide a control method of defrosting an air conditioning apparatus wherein two different refrigerating circuits are equipped.

To accomplish the above-described objects, an air conditioning apparatus includes first and second refrigerating circuits for conditioning air supplied to a defined space. Each of the first and second refrigerating circuits has a heat exchanger, subject to the accumulation of frost thereon, which absorbs heat from air. Each of the first and second refrigerating circuits includes a conditioning state wherein the air supplied to the defined space is conditioned, a ventilating state wherein external air is supplied to the defined space in response to the presence of a predetermined density of a prescribed gas in the defined space, and a defrosting state wherein accumulated frost is removed from the heat exchanger. The air conditioning apparatus also includes a control section for limiting one of the first and second refrigerating circuits only to the conditioning state while the other refrigerating circuit is in the defrosting state without regard to the density of the prescribed gas in the defined space or the presence of frost of the heat exchanger of the one of the first and second refrigerating circuits.

BRIEF DESCRIPTION OF THE DRAWINGS

The present invention is best understood with reference to the accompanying drawings, wherein like reference numerals throughout the various figures denote like structure elements and wherein.

DETAILED DESCRIPTION OF THE PREFERRED EMBODIMENT

A preferred embodiment of the present invention will now be described in more detail with reference to the accompanying drawings.

Figure 1:
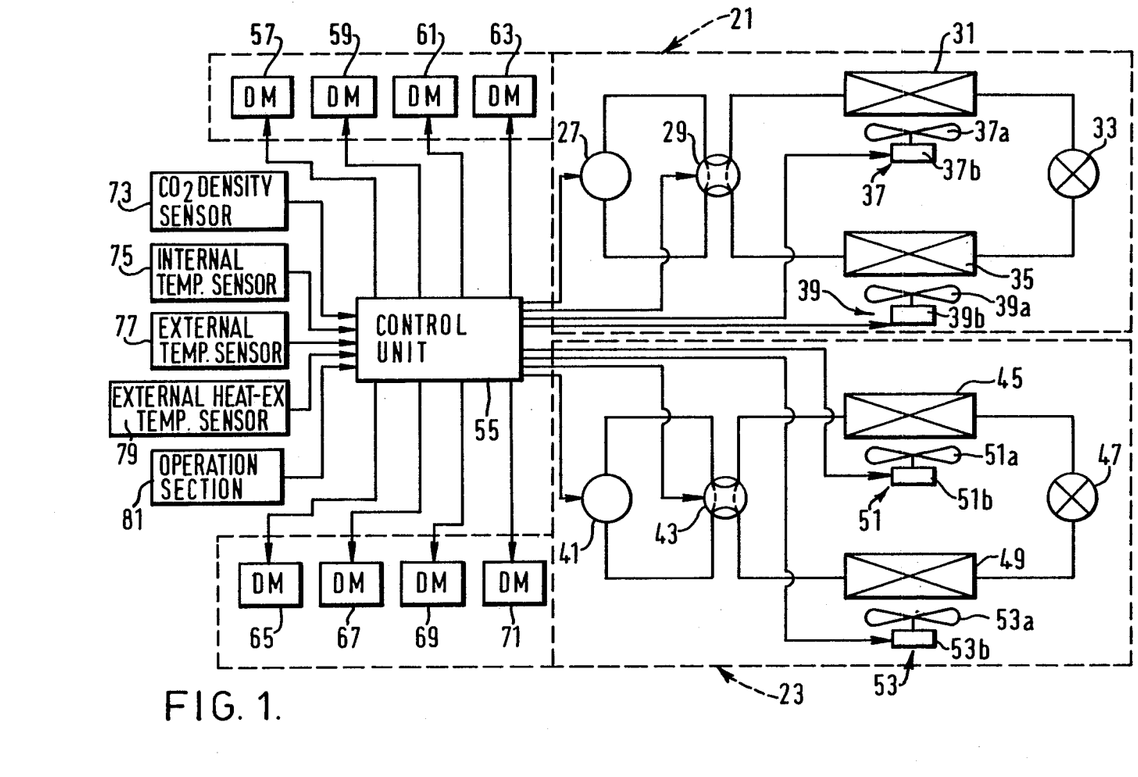
FIG. 1 is a circuit diagram illustrating an air conditioning apparatus of one embodiment of the present invention.
Figure 2:
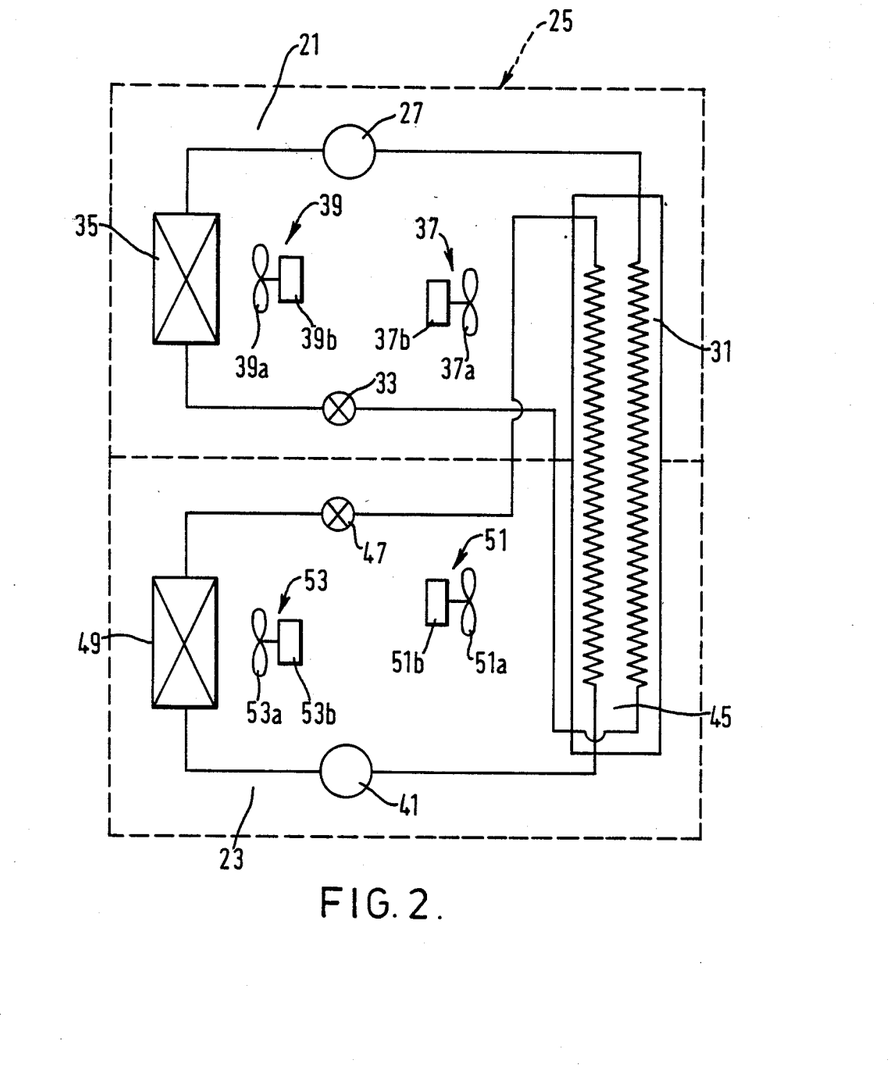
FIG. 2 is a schematic view illustrating the circuit arrangement of an compressor, internal and external fan devices, and internal and external heat-exchangers of each refrigerating circuit of one embodiment shown in FIG. 1.

In FIGS. 1 and 2, two different refrigerating circuits 21 and 23 are arranged in a central unit 25. One of the refrigerating circuits 21 includes a variable capacity compressor 27, a four-way valve 29, an internal heat-exchanger 31, an expansion valve 33, and an external heat exchanger 35. An internal fan device 37 and an external fan device 39 are arranged opposite to the corresponding heat-exchangers 31 and 35 respectively. Internal tan device 37 includes a fan 37a and a motor 37b which drives fan 37a. External fan device 39 also includes a fan 39a and a motor 39b. The other refrigerating circuit 23 also includes a variable capacity compressor 41, a fourway valve 43, an internal heat-exchanger 45, an expansion valve 47, and an external heat-exchanger 49. An internal fan device 51, including a fan 51a and a motor 51b, is arranged opposite to internal heat-exchanger 45. An external fan device 53 including a fan 53a and a motor 53b, is disposed opposite to external heat-exchanger 49. Each element, such as, e.g., compressor, fan device, etc., of refrigerating circuit 21, 23 is controlled by a control unit 55. Control unit 55 includes a microcomputer and its peripheral circuits. Control unit 55 controls damper motors 57, 59, 61 and 63 of refrigerating circuit 21, and damper motors 65, 67, 69 and 71 of refrigerating circuit 23. Each damper motor 57, 59, 61, 63, 65, 67, 69, 71 is disposed in central unit 25 (not shown). Each output signal from a carbonic acid gas sensor 7, an internal temperature sensor 75, an external temperature sensor 77, and an external heat-exchanger temperature sensor 79 is input into control unit 55. The output signal from an operation section 81 is input to control unit 55. Thus, a user may select a desired operation through operation section 81.

As shown in FIG. 2, external heat-exchanger 35, 49 of each refrigerating circuit 21, 23 is separatelY disposed in central unit 25. However, internal heat-exchanger 31 of one of refrigerating circuits 21 is positioned within the same housing as is internal heat-exchanger 45 of the other refrigerating circuit 23.

Figure 3:
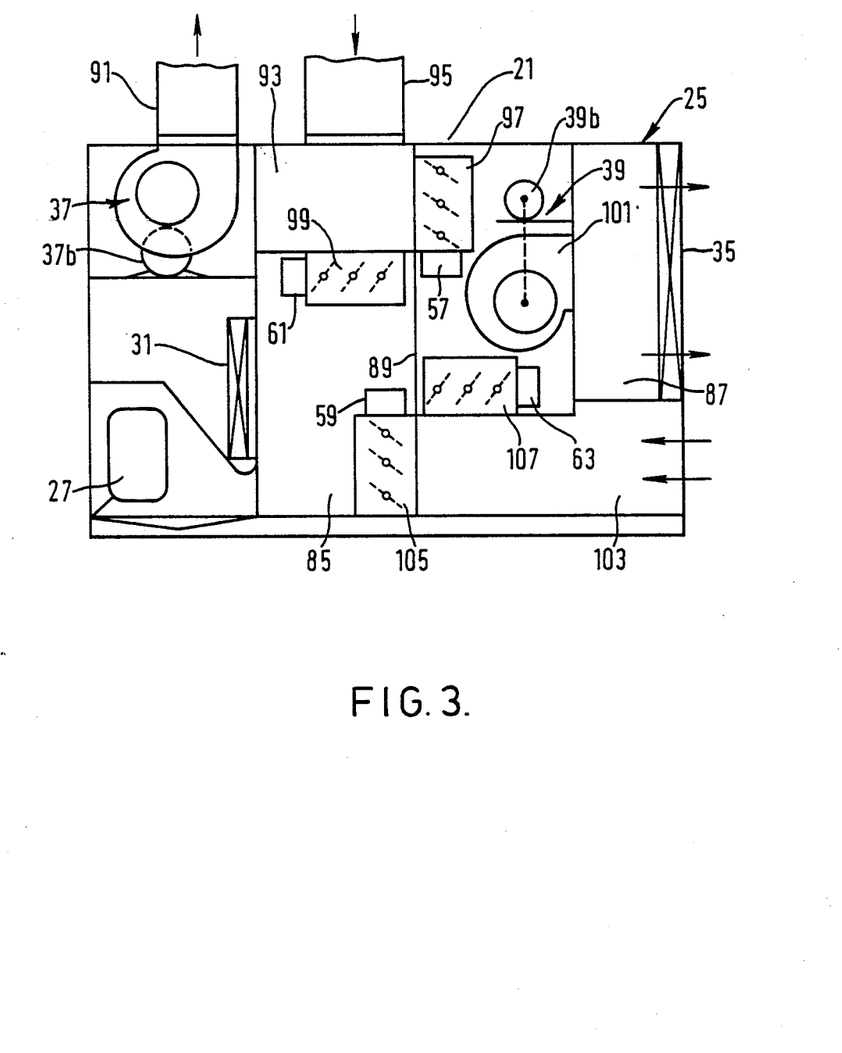
FIG. 3 is a cross sectional side view illustrating arrangement of one of the refrigerating circuits of the air conditioning apparatus of one embodiment shown in FIG. 1.

An arrangement of each element of the above-described refrigerating circuits will be described hereafter. However, since the arrangement of one of the refrigerating circuits is similar to that of the other refrigerating circuit, and therefore, the arrangement of one of the refrigerating circuits will be described. Central unit 25 is partitioned into an internal air flow chamber 85 and an external air flow chamber 87 by a partition wall 89. Internal heat-exchanger 31 (45) is disposed in internal air flow chamber 85 to provide a conditioned air into a defined space. Internal fan device 37 is disposed at the upper part of internal air flow chamber 85. One of the terminals of an air supply duct 91 fluidly communicates with the defined space and the other terminal of air supply duct 91 extends into the upper part of internal air flow chamber 85. Fan 37a of internal fan device 3? is housed in the other terminal of air supply duct 91 to forcibly circulate a conditioned air through central unit 25. Compressor 27 is fixed at the bottom portion of internal air flow chamber 85. Compressor 27 is isolated from the conditioned air fed from internal heat-exchanger 31 (45). A circulating air intake cell 93 is defined at the upper part of internal air flow chamber 85. One end of an internal air return duct 95 is fluidly connected with circulating air intake cell 93, and the other end thereof also is fluidly connected to the defined space. An air exhausting damper 97 is attached to partition wall 89 between circulating air intake cell 93 and external air flow chamber 87 to discharge a part of the circulating air from circulating air intake cell 93 to external air flow chamber 87 therethrough. Air exhausting damper 97 is driven by damper motor 57. An air circulating damper 99 is disposed between circulating air intake cell 93 and internal air flow chamber 85 to control the amount of circulating air entering into internal air flow chamber 85 from circulating air intake cell 93. Circulating air damper 99 is driven by damper motor 61.

External heat-exchanger 35 is disposed at external air flow chamber 87. Air in external air flow chamber 87 is discharged to the outside of central unit 25 through external heat-exchanger 35. External fan device 39 is disposed in external air flow chamber 87. Fan 39a of external fan device 39 is housed in the terminal of an exhausting duct 101, which is opened toward external heat-exchanger 35. Therefore, air in external air flow chamber 87 is forcibly discharged toward external heat-exchanger 35 by external fan device 39. An external air intake cell 103 is defined at the lower part of external air flow chamber 87. External air intake cell 103 opens to the outside of central unit 25. An external air intake damper 105 is attached to partition wall 89 between external air intake cell 103 and internal air flow chamber 85 to control the amount of the external air entering into internal air flow chamber 85 from external air intake cell 103 therethrough. External air intake damper 105 is driven by damper motor 59. An external air discharging damper !07 is disposed between external air intake cell 103 and external air flow chamber 87 to control the amount of air returning to the outside of central unit 25 from external air intake cell 103 through external heat-exchanger 35. External airdischarging damper 107 is driven by damper motor 63.

As described before, the user may input a desired operation, such as. e.g., cooling, heating, ventilating, etc., into control unit 55 through operation section 81. Control unit 55 includes a regular heating/cooling operation control function wherein central unit 25 carries out cooling or heating operation, a ventilating operation control function therein central unit 25 ventilates the defined space. Control unit 55 further includes a defrosting operation control function in which if one of refrigerating circuits 21 carries out the defrosting Operation during heating, the other refrigerating circuit 23 is forcibly maintained the heating operation until one of refrigerating circuits 21 completes the defrosting operation. Control unit 55 also includes an external air flow inhibiting operation function wherein if one of refrigerating circuits 21 carries out the defrosting operation during heating, an external air intake damper (not shown) of the other refrigerating circuit 23 is forcibly maintained in closed state to prevent the external air from flowing into the internal air flow chamber through external air intake cell.

Figure 4:
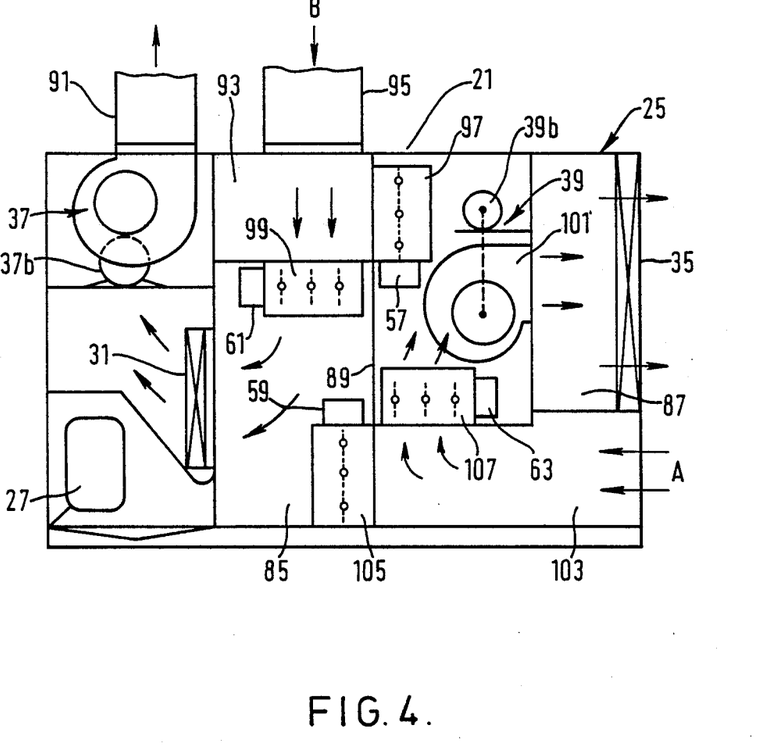
FIG. 4 is a cross sectional side view illustrating operation of each air damper of the air conditioning apparatus shown in FIG. 3 when heating, cooling or defrosting.

The operation of the above-described air conditioning apparatus will now be described. When the user selects the regular cooling operation control function in control unit 55, air exhausting damper 97 and external air intake damper 105 are closed, and circulating air damper 99 and external air discharging damper !07 are opened, as shown in FIG. 4. It should be noted that each damper of the other refrigerating circuit 23 also is controlled as similar to that of the one of refrigerating circuits 21. As indicated by a solid arrow A in FIG. 4, external air taken into external air intake cell 103 forcibly flows through external air discharging damper 107, external fan device 39 and external heat-exchanger 35 in external air flow chamber 87. An internal air taken into circulating air intake cell 93 through internal air return duct 95 flows to internal heat-exchanger 31 45 through air circulating damper 99, as indicated by a solid arrow B in FIG. 4. The internal air is conditioned by internal heat-exchanger 31 45, and the conditioned air flows into the defined space through internal fan device 37 and air supplY duct 91. A similar operation is carried out when the heating operation control function in control unit 55 is selected.

Figure 5:
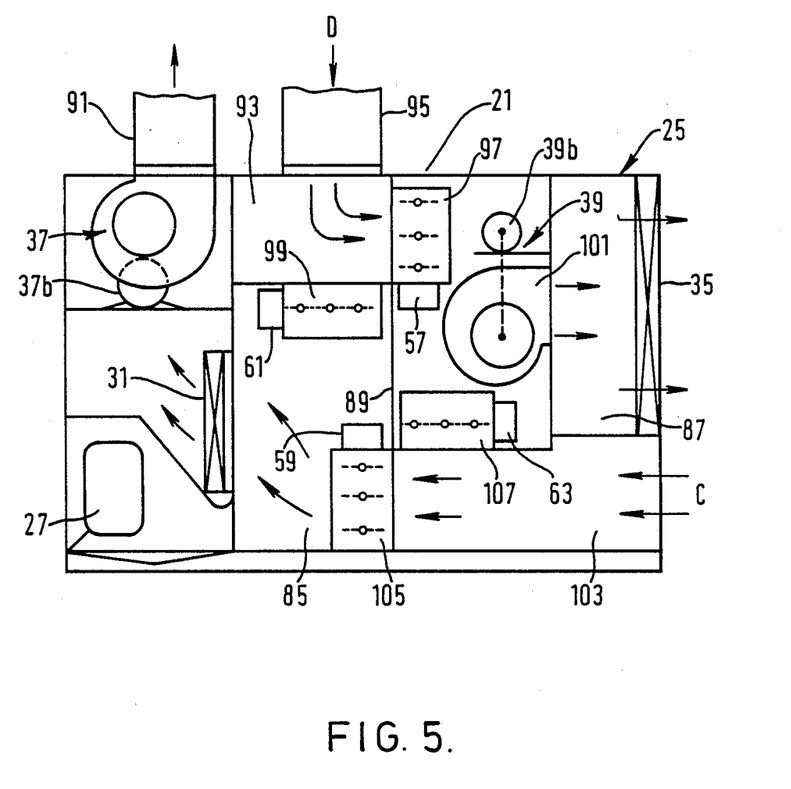
FIG. 5 is a cross sectional side view illustrating operation of each air damper of the air conditioning apparatus shown in FIG. 3 when a cooling operation is carried out by external air.

During cooling, based on the respective detection signals from internal and external temperature sensors 75 and 77, difference in enthalpy between internal air and external air is caluculated by the microcomputer in control unit 55. If the difference in enthalpy increases above a prescribed level, in other words, the internal temperature increases above the external temperature at a prescribed value, compressor 27 (41) in central unit 25 is stopped. At the same time, air exhausting damper 97 and external air intake damper 105 are respectively opened, and air circulating damper 99 and external air discharging damper 107 are closed, as shown in FIG. 5. The external air entering into external air intake cell 103 flows to the defined space through internal heat-exchanger 31 45, internal fan device 37, and air supply duct 91. The internal air taken into circulating air intake cell 93 is discharged through air exhausting damper 97, external fan device 39, exhausting duct 101, and external heat-exchanger 35, as indicated by a solid arrow D in FIG. 5. Thus, the defined space is cooled by the external air.

Figure 6:
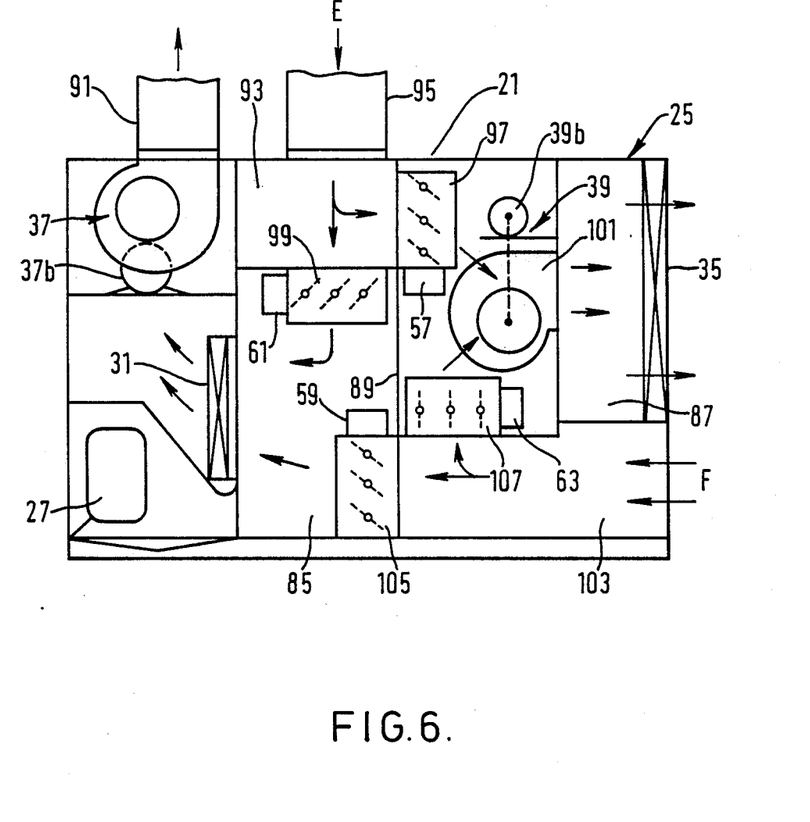
FIG. 6 is a cross sectional side view illustrating operation of each air damper of the air conditioning apparatus shown in FIG. 3 when a ventilating operation is carried out during cooling or heating.

As shown in FIG. 6, if the carbonic acid gas density in the defined space detected by sensor 73 increases above a predetermined level during heating or cooling, external air discharging damper !07 is maintained in the open state, and air exhausting damper 97, external air intake damper 105, and air circulating damper 99 are proportionallY controlled to open at a prescribed degree. A part of the internal air taken into circulating air intake cell 93 is discharged through air exhausting damper 97, external fan device 39, and external heat-exchanger 35. Remaining internal air in circulating air intake cell 93 is returned to the defined space through air circulating damper 99, internal heat-exchanger 31(45), internal fan device 37, and air supply duct 91, as indicated by a solid arrow E in FIG. 6. At the same time, a part of the external air taken into external air intake cell 103 enters into internal air flow chamber 85, and is mixed with the internal air to flow into the defined space. Remaining external air to flow into the defined space. Remaining external air in external air intake cell 103 is discharged through air discharging damper 107, external fan device 39, and external heat-exchanger 35, as indicated by a solid arrow F in FIG. 6. Thus, the defined space is ventilated by the external air, as described above. When the carbonic acid gas density detected by sensor 73 decreases below the prescribed level, air discharging damper 97, external air intake damper 105, and air circulating damper 99 are returned to the respective original positions, as shown in FIG. 4.

Figure 7:
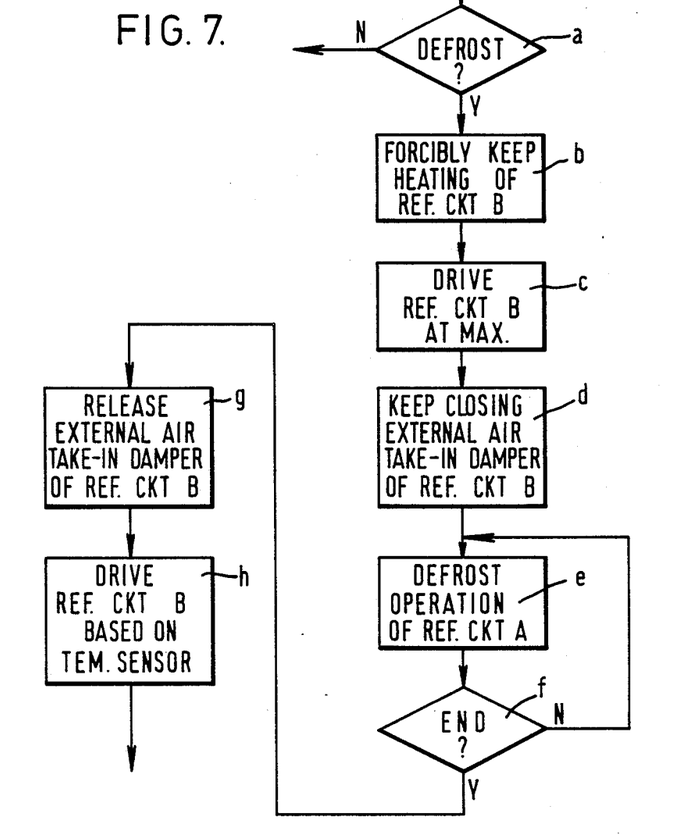
FIG. 7 is a flow chart illustrating the defrosting operation of the air conditioning apparatus shown in FIG. 1.

The defrosting operation control function of control unit 55 will be described with reference to FIG. 7. If the temperature of external heat-exchanger 35 of one of refrigerating circuits 21 (REF. CKT A in FIG. 7) detected by external heat-exchanger temperature sensor 79 increases above a predetermined value during heating, the defrosting operation control function is automatically carried out by control unit 55 (step a). Firstly, the heating operation of the other refrigerating circuit 23 (REF. CKT B in FIG. 7) is forcibly maintained (step b). In step c, heating capacity of compressor 41 of the other refrigerating circuit 23 is increased at a maximum level. In step d, the external air intake damper of the other refrigerating circuit 23 is forcibly maintained at a closed position. The defrosting operation of one of the refrigerating circuits 21 is carried out in step e. At this time, air exhausting damper 97 and external air intake damper 105 of one of refrigerating circuits 21 (REF. CKT A) are closed, and air circulating damper 99 and external air discharging damper 107 of one of refrigerating circuits 21 are closed while the defrosting operation of one of refrigerating circuits 21 is carried out. If the defrosting operation of one of refrigerating circuits 21 is completed, the YES-path is taken in step f. Otherwise, NO-path is taken, and the defrosting operation of one of refrigerating circuits 21 is continued in step e. In step g, forcible closed state of the external air intake damper of the other refrigerating circuit 23 (REF. CKT B) is released. Compressor 41 of the other refrigerating circuit 23 is controlled based on the detection signal from internal temperature sensor 75 in step h. Also, compressor 27 of one of refrigerating circuits 21 is controlled by control unit 55 in accordance with the detection signal from internal temperature sensor 75. Thus, a regular heating operation is re-started. In the above-described steps, the heating operation of the other refrigerating circuit 23 is forcibly maintained until the defrosting operation of one of refrigerating circuits 21 is completed even if the defrosting operation of the other refrigerating circuit 23 is needed. The defrosting operation of the other refrigerating circuit 23 is executed immediately after the defrosting operation of one refrigerating circuit 21 is ended. When the defrosting operation of the other refrigerating circuit 23 is carried out, the above-described steps are sequentially executed by changing the REF. CKT A to the REF. CKT B and vice versa in FIG. 7.

In the above-described embodiment, the external air intake damper of one of the refrigerating circuits which forcibly carries out heating operation is maintained at a closed position to prevent external air from flowing into the internal air flow chamber of one of the refrigerating circuits while the defrosting operation of the other refrigerating circuit is executed. Therefore, temperature of the conditioned air fed from central unit 25 through internal heat-exchanger 31 (45) into the defined space is maintained at a desirable level. Furthermore, since the heating capacity of one of the refrigerating circuits increases at a maximum level while the defrosting operation is carried out in the other refrigerating circuit, temperature in the defined space seldom decreases. Therefore, a comfortable air conditioning operation may be maintained even if the defrosting operation is carried out during heating.

The present invention has been described with respect to a specific embodiment. However, other embodiments based on the principles of the present invention should be obvious to those of ordinary skill in the art. Such embodiments are intended to be covered by the claims.

What is claimed is:

1. An air conditioning apparatus comprising:
    first and second refrigerating circuit means including first and second internal heat exchangers, respectively, the internal heat exchangers being combined within a shared housing, for conditioning air supplied to a defined space, each refrigerating circuit including external heat exchanger means for absorbing heat from air, the external heat exchanger means being subject to the accumulation of frost thereon, the first and second refrigerating circuit means each having a conditioning state wherein the air supplied to the defined space is conditioned, a ventilating state wherein air from an external source is supplied to the defined space in response to the presence of a predetermined density of a prescribed gas in the defined space, and a defrosting state wherein accumulated frost is removed from the external heat exchanger means; and
    control means for limiting one of the first and second refrigerating circuit means only to the conditioning state while the other refrigerating circuit means is in the defrosting state regardless of the density of the prescribed gas in the defined space or the presence of frost of the external heat exchanger means of the one of the first and second refrigerating circuit means.

2. An apparatus according to claim 1, wherein the first refrigerating circuit means includes an external air intake damper having a closed position for taking the external air into the defined space and an air exhausting damper for discharging air from the defined space.

3. An apparatus according to claim 2, wherein the second refrigerating circuit means includes an external air intake damper having a closed position for taking the external air into the defined space and an air exhausting damper for discharging air from the defined space, the external air intake damper of one of the first and second refrigerating circuit means being maintained at the closed position while the other refrigerating circuit means is in the defrosting state.

4. An air conditioning apparatus comprising:
    central casing means having an internal air flow chamber fluidly communicating with a defined space, and an external air flow chamber fluidly communicating with an external space;
    first and second refrigerating circuits disposed in the central casing means, each including external heat exchanger means for absorbing heat from external air, the external heat exchanger means being subject to the accumulation of frost thereon, the first and second refrigerating circuits each including external air intake damper means for taking the external air into the internal air flow chamber from the external air flow chamber, the first and second refrigerating circuits each having a conditioning state wherein air supplied to a defined space is conditioned, a ventilating state wherein the external air is supplied to the defined space in response to the presence of a predetermined density of a prescribed gas in the defined space, and a defrosting state wherein accumulated frost is removed from the external heat exchanger means,
    one of first and second refrigerating circuits forcibly being in the conditioning state while the other refrigerating circuit is in the defrosting state; and
    control means for forcibly closing the external air intake damper means of one of the first and second refrigerating circuits while the other refrigerating circuit is in the defrosting state.

5. An apparatus according to claim 4, wherein the first refrigerating circuit includes an internal heat exchanger disposed in the internal air flow chamber.

6. An apparatus according to claim 5, wherein the second refrigerating circuit includes a second internal heat exchanger combined into the first internal heat exchanger of the first refrigerating circuit disposed in the internal air flow chamber.

7. An apparatus according to claim 4, wherein the first and second refrigerating circuit each includes variable capacity oompressor means for compressing refrigerant.

8. An apparatus according to claim 7, wherein the control means includes driving means for driving the variable capacity compressor means of one of the first and second refrigerating circuits at a substantially maximum heating capacity level while the other refrigerating circuit is in the defrosting state.

9. An apparatus according to claim 4, wherein the control means includes a carbonic acid gas sensor for detecting the density of carbonic acid gas in the defined space.

10. An apparatus according to claim 9, wherein the first and second refrigerating circuits each includes air exhausting damper means for discharging internal air from the defined space to an external space.

11. An apparatus according to claim 10, wherein the control means includes damper control means responsive to the carbonic acid gas sensor for opening the air exhausting damper means and the external air intake damper means for ventilating the defined space.

12. An apparatus according to claim 10, wherein the first and second refrigerating circuits each includes air circulating damper means associated with the air exhausting damper means for controlling the amount of internal air taken into the internal air flow chamber.

13. An apparatus according to claim 4, wherein the first and second refrigerating circuits each includes external air discharging damper means associated with the external air intake damper means for controlling the amount of external air taken into the external air flow chamber.

14. A defrosting operation control method for an air conditioning apparatus having first and second refrigerating circuits for executing a heating operation, a ventilating operation, or a defrosting operation, comprising the steps of:

limiting the operation of one of first and second refrigerating circuits only to the heating operation while the other refrigerating circuit is executing the defrosting operation; and inhibiting the ventilating operation of the one of the first and second refrigerating circuits while the other refrigerating circuit is executing the defrosting operation.

15. A method according to claim 14, wherein the first and the second refrigerating circuits respectively include a variable oapacity compressor, the limiting step includes the step of forcibly driving the variable capacity compressor of the one of the first and second refrigerating circuits at its substantially maximum heating capacity level until the other refrigerating circuit completes the defrosting operation.

* * * * *